Patented May 25, 1943

2,320,301

UNITED STATES PATENT OFFICE 2,320,301

PREPARATION OF A UREA-FORMALDEHYDE ADHESIVE

Paul O. Powers, Lancaster, Pa., assignor to Armstrong Cork Company, Lancaster, Pa., a corporation of Pennsylvania No Drawing. Application June 8, 1939,
Serial No. 278,130

3 Claims. (Cl. 260—69)

This invention relates generally to adhesives and more particularly to adhesives which comprise the condensation product of urea or its derivatives and aliphatic aldehydes, such for example as formaldehyde.

Although adhesives produced according to the present invention are suitable for a wide variety of purposes, they are particularly suited for cementing the glass applicator rods or droppers or liner disks of cork or pulpboard to bottle caps made of phenolic condensation products. Other uses of the adhesives are for joining metal foil discs to cork bottle stoppers, adhering glass to cork, wood to cork and metal to metal.

The adhesive of the present invention has been found to effectively join glass applicators to phenolic condensation product bottle caps. It has good adherence to the glass applicator and to the bottle cap. It cures or sets rapidly upon heating to a suitable temperature and shows no tendency to crack on drying. It sets at room temperature on standing for a time determined by the accelerator employed. It is water resistant, acid resistant and sets quickly enough on heating so that it is eminently suited for various commercial applications.

The following is a specific example of one manner in which the adhesive may be produced, it being understood that the invention is not limited to the specific example, which is given merely for illustrative purposes. Ten pounds of crystalline urea and 30 pounds of 37% formalin are charged into a reaction vessel equipped with a stirrer and the pH or hydrogen ion concentration is adjusted by the addition of a dilute solution of sodium hydroxide, potassium hydroxide, barium hydroxide or other suitable alkali. The pH of the mixture is adjusted to about 5.5 to 7.0 and preferably to about 6.0 to 6.5. The temperature of the mixture is then raised to about 140–180° F., preferably about 160° F., and held at that temperature for 1 to 3 hours, in order to cause condensation. The pH of 5.5 to 7.0 must be maintained during the heating and until proper condensation is effected. The mass tends to get acidic as heating progresses and further additions of alkali may be found necessary in order to keep the pH adjusted to the desired range. At the end of the heating period, more caustic soda or other suitable alkali is added until the pH is raised to 9–11. The pH must be at least 9 and may be over 11. The temperature is then raised to the boiling point and water is evaporated until the temperature in the reaction vessel reaches about 240° F. The temperature of the reacted mass should not exceed 250° F. since at temperatures in excess of this precipitation results and there is a general hardening of the resin. The batch is then cooled below its normal boiling point, preferably to about 160° F., and vacuum is applied to remove a further quantity of water. I may use 27–28" vacuum, the temperature of the resin remaining at 160° F. The vacuum treatment may be used to reduce the water content to about 5% but the product is too viscous for convenient application. Ordinarily it is not desired to reduce the water to below about 15% or 12%. The resin thus obtained is a rather viscous liquid which is substantially but not completely anhydrous and which slowly thickens over a period of weeks at room temperature but which may be quickly set by the addition of an acidic accelerator and the application of heat.

In some cases, it is unnecessary to employ vacuum after the batch has been boiled to remove water. Boiling the batch until its temperature reaches about 240° F. reduces the water content of the mass to approximately 20%, which is sufficient for many purposes. An adhesive having this low water content shows little or no tendency to crack on drying. The amount of water in the reacted product may be determined by weighing the amount of condensate produced during the reaction. Where, however, it is desired to remove further water so as to make the adhesive substantially anhydrous, the vacuum treatment may be used after the boiling operation.

When the resin is about to be used, it is mixed with an accelerator of condensation and the mixed resin and accelerator are applied to the parts to be joined or treated. The accelerator preferably is a 50% solution by weight of lactic acid in water. The amount of lactic acid is preferably about 3–10%, based on the weight of the adhesive. After the adhesive has been applied, it is set up by baking at a temperature of about 200–250° F. The resin will also cure at room temperature after several hours. Other acids, such as hydrochloric, phosphoric, tartaric, acetic and a large number of inorganic or organic acids have a similar accelerating effect. Hydrochloric acid is very fast, in fact too fast for most commercial uses. Acetic acid will effect a cure but the setting is very slow. In my adhesive, I prefer to use an acidic accelerator which produces a final pH of between 2 and 5 or more particularly between 3 and 4. Lactic acid is the preferred accelerator.

I have found that although the ratio of formaldehyde to urea may be varied somewhat, it is important that this ratio be kept within certain limits for best results. Where a formalin solution of 37% strength is used, the preferred proportions are 30 pounds of formalin to ten pounds of crystalline urea or a weight ratio of formalin to urea of 3:1. This corresponds to a molar ratio of formaldehyde to urea of about 2.2 to 1. The formalin solution (37%) used for ten pounds of urea may vary between 20 and 50 pounds. This corresponds to a molar ratio of formaldehyde to urea between 1.5:1 and 3.7:1. When the preferred ratio is not used, the results obtained are not so satisfactory. Where large amounts of formalin are used, it slows down the reaction and it is necessary to boil off the excess during the evaporation.

It is important that the pH of the reaction mass be maintained between 5.5 and 7.0 or, better still, between 6.0 and 6.5 during the time that the condensation is taking place. If the mass is more alkaline than pH 7, condensation does not proceed far enough to produce a satisfactory resin. On the other hand, if the solution is more acidic than pH 5, resin formation proceeds too rapidly and the resin soon precipitates from aqueous solution.

An important advantage of my process is that it enables the production of a substantially anhydrous adhesive which avoids dimensional changes and the cracking which would result upon drying an adhesive containing substantial amounts of water. I have found that water may be boiled off from the reacted mass without converting the mass into the insoluble condition, if the mass is made sufficiently alkaline—that is, is adjusted so that its pH is at least 9.0. This enables me to eliminate most of the water merely by boiling and where it is desired to eliminate still further quantities of water, this may be done by the application of vacuum following the boiling treatment. If it were attempted to remove the water by boiling the reacted mass under acidic conditions, the resin would change almost immediately (10 to 15 minutes) to the insoluble condition.

A modified adhesive may be made in exactly the same manner as above described, except that there is used ten pounds of urea, three pounds of glycerine or an equivalent of other plasticizer, for example diethylene glycol, ethylene glycol, sorbitol or other polyhydroxide compound, and 30 pounds of 37% formalin. This modified adhesive has better adhesion to glass than the other resin and is particularly useful in any case where increased flexibility is desired, such as in joining metal foil to cork.

An important characteristic of these adhesives, whether or not they contain a plasticizer, is that most of the water may be eliminated by mere distillation without resorting to vacuum or low temperature drying methods. This results in an adhesive having a low water content which does not crack upon drying. An important characteristic of the potentially reactive resin, that is the resin prior to the addition of accelerator, is the unusually long shelf-life, being from two to three months without harmful hardening, which is highly important in an adhesive to be used commercially and required to be made in large quantities and stored. The further reduction of the percentage of water in the final mass by the use of vacuum distillation results in an adhesive which has somewhat enhanced shelf-life.

In place of urea, I may use thiourea or other urea derivatives. Although the preferred aldehyde is formaldehyde, I may use other aliphatic aldehydes.

The invention is not limited to the preferred examples or the preferred proportions of ingredients but may be otherwise embodied or practiced within the scope of the following claims.

I claim:

1. The process of making an adhesive, which comprises providing an aqueous solution having a molar ratio of formaldehyde to urea of about 2.2:1, said formaldehyde being present in the form of an aqueous solution of formaldehyde in water, adjusting the solution to a pH of about 5.5 to 7.0 by the addition of a fixed alkali, heating the mixture to about 140 degrees to 180 degrees F. for about one to three hours while maintaining the pH at about 5.5 to 7.0, adjusting the pH of the reacted mixture to at least 9.0 by addition of a fixed alkali and boiling it without applying vacuum but while maintaining it at a pH of at least 9.0 until it contains about 20% water.

2. The process of making an adhesive, which comprises providing an aqueous solution having a molar ratio of formaldehyde to urea of about 2.2:1, said formaldehyde being present in the form of an aqueous solution of formaldehyde in water, adjusting the solution to a pH of about 6.0 to 6.5 by the addition of a fixed alkali, heating the mixture to about 160° F. for about 1 to 3 hours while maintaining the pH at about 6.0 to 6.5, adjusting the pH of the reacted mixture to between 9.0 and 11.0 by addition of a fixed alkali and boiling it without applying vacuum but while maintaining it at a pH between 9.0 and 11.0 until it contains about 20% water.

3. The process of making an adhesive, which comprises providing an aqueous solution having a molar ratio of formaldehyde to a compound selected from the group consisting of urea and thiourea of about 2.2:1, said formaldehyde being present in the form of an aqueous solution of formaldehyde in water, adjusting the solution to a pH of about 5.5 to 7.0 by the addition of a fixed alkali, heating the mixture to about 140 degrees to 180 degrees F. for about one to three hours while maintaining the pH at about 5.5 to 7.0, adjusting the pH of the reacted mixture to at least 9.0 by addition of a fixed alkali and boiling it without applying vacuum but while maintaining it at a pH of at least 9.0 until it contains about 20% water.

PAUL O. POWERS.